N. H. MOTSINGER.
ROTARY ENGINE.
APPLICATION FILED AUG. 11, 1915.
1,272,297.
Patented July 9, 1918.
5 SHEETS—SHEET 5.
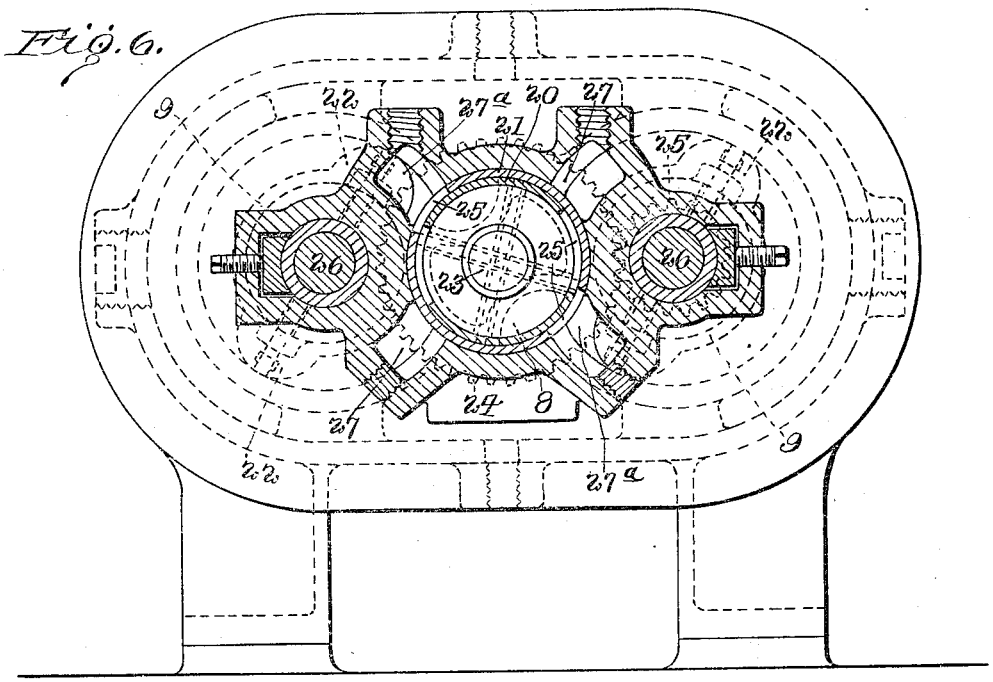
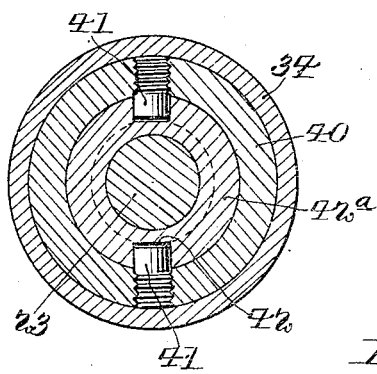
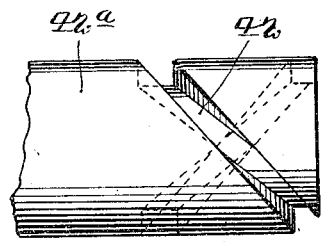
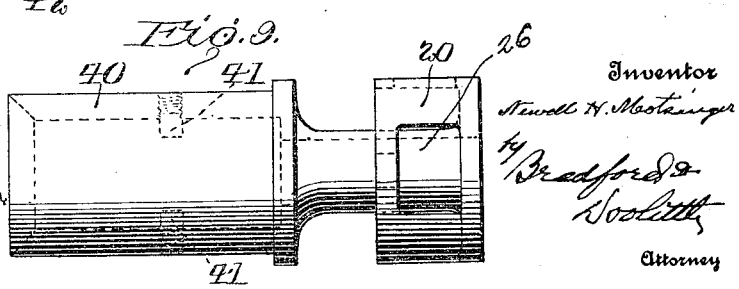

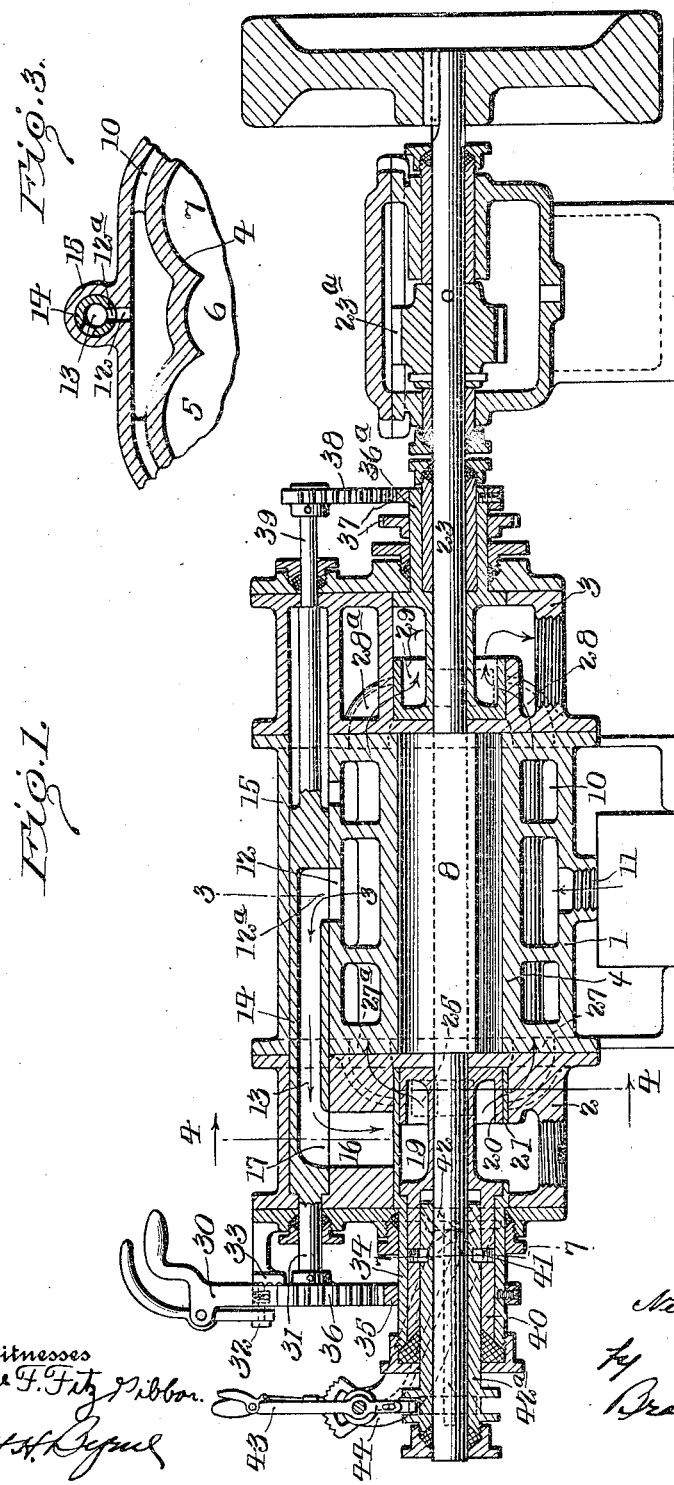

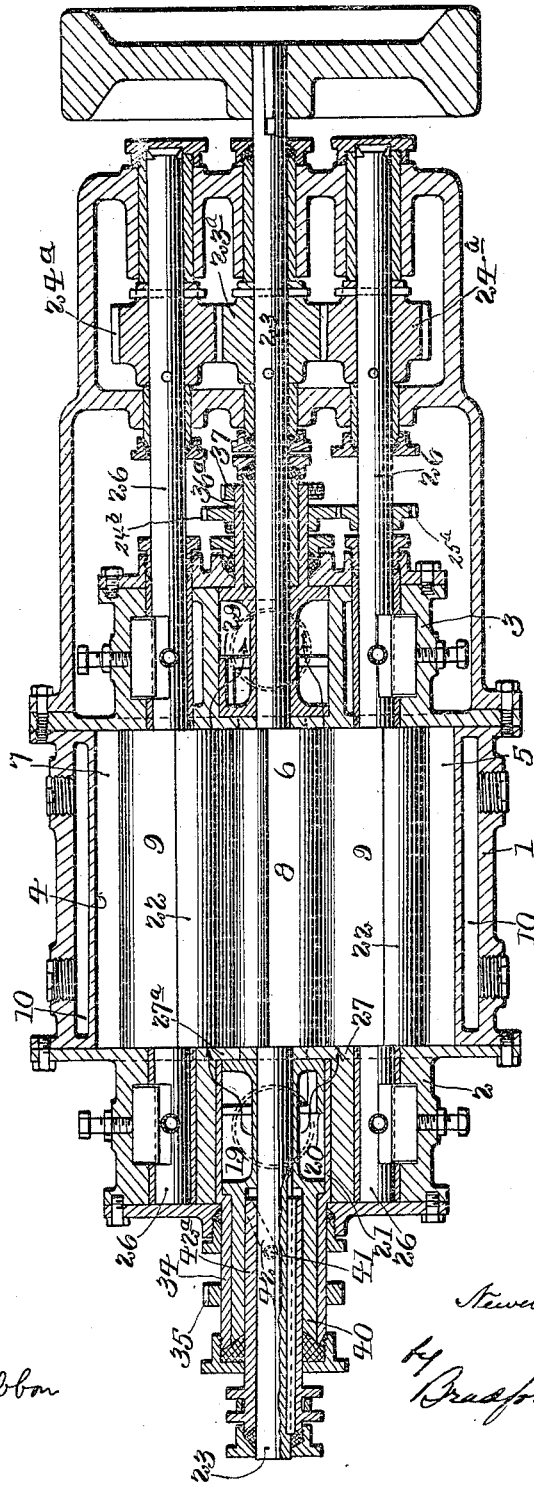

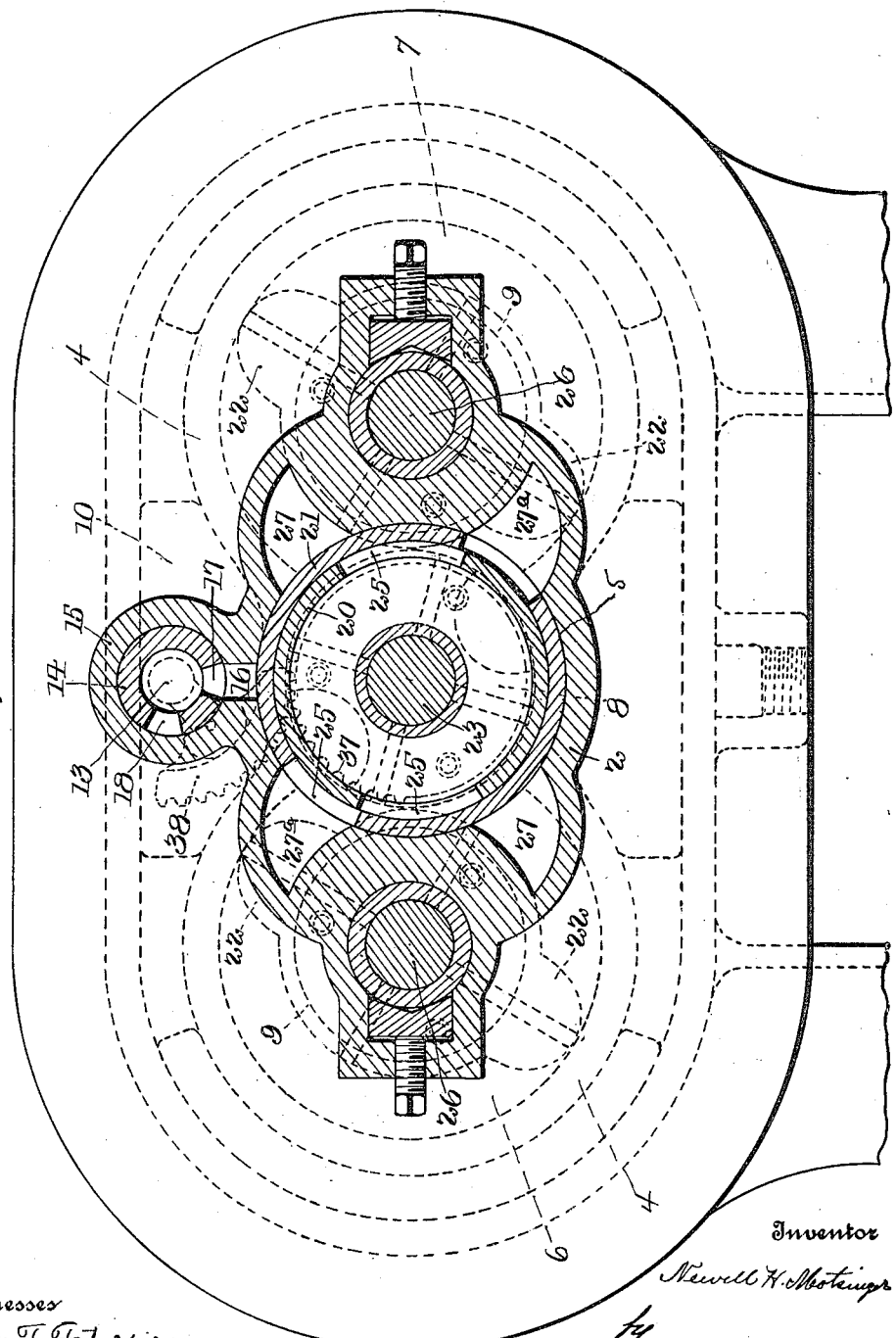

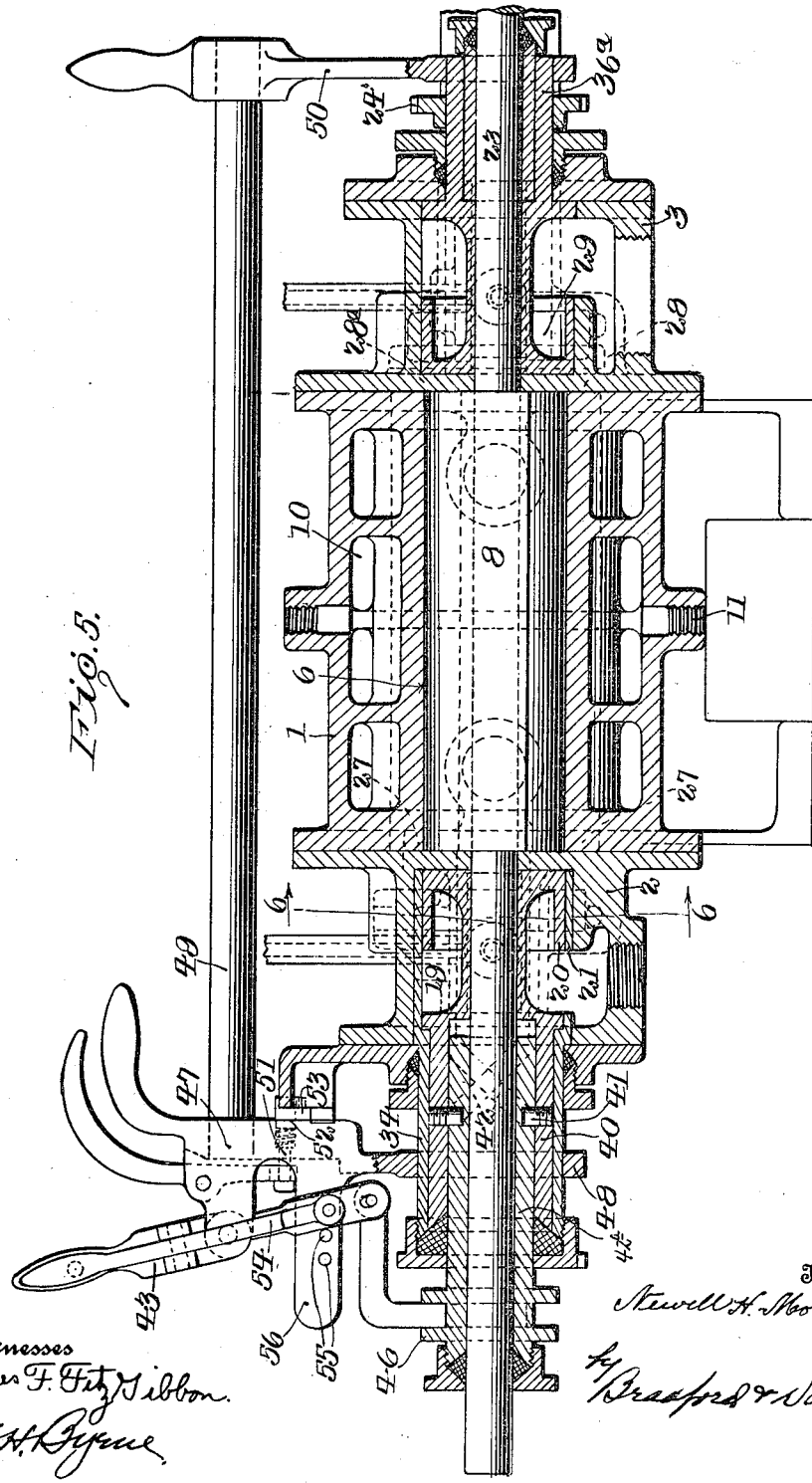

UNITED STATES PATENT OFFICE.

NEWELL H. MOTSINGER, OF FREDONIA, PENNSYLVANIA.

ROTARY ENGINE.

1,272,297.    Specification of Letters Patent.    Patented July 9, 1918.

Application filed August 11, 1915. Serial No. 44,857.

*To all whom it may concern:*

Be it known that I, NEWELL H. MOTSINGER, a citizen of the United States, residing at Fredonia, Mercer county, and State of Pennsylvania, have invented and discovered certain new and useful Improvements in Rotary Engines, of which the following is a specification.

The present invention relates to rotary engines and consists of the combinations and arrangements of parts hereinafter described and particularly set forth in the accompanying claims.

The invention has for its purpose to provide a double acting rotary engine wherein the spent steam impulses will successively serve as cushions for the rotors against the acting steam impulses, thereby insuring a perfect balance for the rotors when operating, and relieving the thrust on the main engine bearings.

The invention has for its further purpose to employ rotors having two vanes, and with the steam jacket and ports so constructed and arranged that the maximum efficiency will be derived from the initial energy.

The invention further contemplates an arrangement of reverse mechanism whereby it will not be required to direct the steam from one end of the engine to the other to reverse, but in which the steam will act from the one position of discharge to drive forward or reverse.

The invention is shown by way of illustration in the accompanying drawings, wherein—

Figure 1 is a central longitudinal sectional view thereof,

Fig. 2 is a top plan sectional view of the same,

Fig. 3 is a partial sectional view taken on the line 3—3 of Fig. 1,

Fig. 4 is a transverse sectional view taken on the line 4—4 of Fig. 1,

Fig. 5 is a central longitudinal sectional view of a modified construction of engine, Fig. 6 is a transverse sectional view taken on the line 6—6 of Fig. 5.

Fig. 7 is a transverse sectional view of one of the valve actuating devices taken on the line 7—7 of Fig. 1, Fig. 8 is a detailed view, partly broken away, of the valve actuating sleeve, and Fig. 9 is a detailed view of the steam inlet valve.

Referring to the construction in detail, the engine consists of a central section 1, and end sections 2 and 3 constructed to provide an inner wall 4 forming chambers 5, 6, and 7 to receive the rotor 8 and the pair of piston rotors 9, respectively. A steam chamber 10 surrounds the rotor chambers in the middle section 1 and receives steam from the inlet 11 located at the bottom thereof, and which passes off at the top through the outlet 12 into the ports $12^a$ of the passage-way 13 of the rotary valve 14 that works in the cylinder 15 on top of the engine (see Figs. 1, 3, and 4). The valve passage 13 communicates with the chamber 16 at the head of the engine through either of the ports 17 or 18 for the forward and reverse drives, respectively. A central chamber 19 communicates with the steam chamber 16, and said communication is controlled by a pair of coöperable valves 20 and 21 for governing the flow of steam and regulating the direction of rotation of the engine.

The rotor 8 is provided with pockets or grooves to receive the vanes 22 carried by the rotors $9^a$, and each rotor $9^a$ has two such vanes disposed in diametrically opposed relation to the end that the vanes of both rotors are acted on simultaneously and with two impulses of steam for each revolution of the rotor. And the shaft 23 of the grooved rotor is geared to be rotated with the piston rotors by the pinions $23^a$ and $24^a$ mounted on shaft 23 and the shafts 26 of said piston rotors (see Fig. 2).

In operation the steam passes from the chamber 19 through ports 26 (in the valve 20) into passages 27 or $27^a$ (see Figs. 1 and 6), cored in the head of the engine, and thence into the spaces between the middle and piston rotors to operate the latter, in the usual manner. The ports 27 and $27^a$ are designed to operate (see Fig. 6) in diagonal pairs, and following each half revolution of the rotor the spent steam exhausts at the opposite end of the cylinders through the ports 28 or $28^a$ and past the valve 29 to atmosphere. The steam inlet ports 27 and $27^a$ are located at one end of the cylinder, and in like manner the exhaust ports 28 and $28^a$, at the other end, and by this arrangement said inlet and exhaust valves work in diametrically opposite pairs to drive the engine forward or reverse from the steam admitted at one end of the cylinder only.

The valve 14 is adapted to be rotated by means of a lever 30 secured to the valve shaft 31 and a spring pressed pawl 32 carried by said lever engages with a rack 33 to hold the valve 14 in set position. The valve 21 is formed with a sleeve extension 34 carrying a quadrant pinion 35 that meshes with the quadrant pinion 36 on the lever 30 to the end that said valve 21 will be actuated simultaneously with the rotation of the valve 14. And the exhaust valve 29 is also formed with a sleeve 36ª carrying a quadrant pinion 37 that meshes with the quadrant pinion 38 that is mounted on the shaft extension 39 of said valve 14. By this arrangement the valves 14, 21, and 29 will be moved simultaneously, and said valves and the associated gearing are so disposed that their operations will occur in the proper relation.

The valve 20 is formed with a sleeve 40 provided with a pair of pins 41 that engage with spiral slots 42 formed in the face of a collar 42ª that is keyed to slide on the central shaft 23. Said collar 42ª is adapted to be shifted by the lever 43 engaging therewith and which is fulcrumed on an arm 44 suitably secured to the frame of the engine. Thus the shifting of the collar 42ª will, through the instrument of the slots 42, cause the valve 20 to be rotated to vary the extent of its port openings, and work the same for forward and reverse.

In the arrangement shown in Figs. 5 and 6 the working parts of the engine are arranged and operated after substantially the manner described in the foregoing, and a detailed description thereof will, therefore, not be given. This construction, however, employs a novel form of valve actuating means, while the valve construction itself is likewise the same as above disclosed.

The valve 20 has a sleeve extension 40 carrying pins 41 engaging the spiral slots 42 formed in the sleeve 42ª and said sleeve is shifted by the lever 43 that has an arm engaging collar 46 on said sleeve. The lever 43 is fulcrumed on the lever 47 which is, in turn, mounted on a ring 48 surrounding and secured to the sleeve 34 of the valve 21. And a bar 49 connects the lever 47 with a second lever 50 that is mounted on the sleeve 36ª of the exhaust valve 29. Said levers 47 and 50 are adapted to be held in position by means of a pawl 51 engaging with the teeth 52 of the rack 53, and the lever 43 is in like manner adapted to be secured in set position by the pawl carrying arm 54 whose pawl engages with openings 55 formed in the bar 56 that is mounted on the lever 47.

When it is desired to use the engine as an explosive engine the segmental gears are removed and a pinion 24ᵇ is mounted on the valve sleeve 36ª, in place of the quadrant pinion 37, and meshes with the pinions 25ª mounted on the shaft 26 of said piston rotors, and runs in the ratio of two to one. The gearing (24ª and 25ª) may be located at either end of the engine, as will be understood, or such a gearing may be located at each end of the engine if desired. Also two pinions 25ª may be used with the pinion 24.

It will be seen from the foregoing that by the provision of mounting two rotors to either side of the steam distributing center any tendency of the vanes to bind is obviated, and it will be further noted that the spent steam impulses will successively serve as cushions for the rotors against the acting steam impulses, thereby obtaining a perfect balance for the operating parts and relieving the thrust on the bearings of the two rotors.

It is obvious that those skilled in the art may vary the details of construction and arrangement of parts without departing from the spirit of the invention, and therefore I do not wish to be limited to such features except as may be required by the claims.

Having thus described my invention, what I claim as new and desire to protect by United States Letters Patent is:

1. In a rotary engine the combination of a casing providing a central and side cylinders, a steam jacket surrounding said cylinders, a steam chamber, piston rotors mounted to operate in the side cylinders, a rotor coöperable with said piston rotors mounted in the central cylinder, a rotary valve controlling the passage of steam from said jacket to the steam chamber, a rotary valve controlling the passage of steam from said chamber to the piston rotors, and a common manually controlled means for actuating said valves, substantially as set forth.

2. In a rotary engine the combination of a casing providing a central and side cylinders, a steam jacket, and a steam chamber, piston rotors mounted to operate in the side cylinders, a rotor coöperable with said piston rotors mounted in the central cylinder, a rotary valve controlling the passage of steam from the jacket into the steam chamber, a pair of coöperable valves controlling the passage of steam from said chamber to the piston rotors, a common manually controlled means for actuating said passage controlling valve and one of the pair of valves, and a manually controlled means for actuating the other of the pair of valves, substantially as set forth.

3. In a rotary engine the combination of a casing providing a central and side cylinders, a steam jacket, and a steam chamber, a cylinder mounted on said casing, a rotary valve mounted in said cylinder and having a passage-way adapted to communicate with said steam jacket and the steam chamber, a pair of valves mounted in said steam chamber and controlling the passage of steam to the piston rotors, a lever secured to said first named valve and provided with a quadrant gear, a quadrant gear connected to one of the valves of said pair and meshing with the quadrant gear to be actuated with said first named valve, and means for actuating the other valve of said pair, substantially as set forth.

4. In a rotary engine the combination of a casing providing a central and side cylinders, a steam jacket, and a steam chamber, a cylinder mounted on said casing, a rotary valve mounted in said cylinder and having a passage-way adapted to communicate with said steam jacket and the steam chamber, a pair of valves mounted in said steam chamber and controlling the passage of steam to the piston rotors, an exhaust valve for said piston rotors, quadrant gears connected to one of said pair of valves and the exhaust valve, quadrant gear connections between said quadrant gears and the first named valve, means for actuating said first named valve, and means for actuating the other valve of said pair, substantially as set forth.

5. In a rotary engine the combination of a casing providing a central and side cylinders, a steam jacket, and a steam chamber, a cylinder mounted on said casing, a rotary valve mounted in said cylinder and having a passage-way adapted to communicate with said steam jacket and the steam chamber, a pair of valves mounted in said steam chamber and controlling the passage of steam to the piston rotors, an exhaust valve for said piston rotors, quadrant gears connected to one of said pair of valves and to the exhaust valve, quadrant gear connections between said quadrant gears and the first named valve, means for actuating said first named valve, and a lever having spiral connection with the other valve of said pair to actuate the same, substantially as set forth.

6. In a rotary engine the combination of a casing providing a central and side cylinders, a steam jacket, and a steam chamber, piston rotors mounted to operate in the side cylinders, a rotor coöperable with said piston rotors mounted in the central cylinder, a cylinder mounted on the casing and communicating with the steam jacket, a valve mounted to rotate in said cylinder and having a passage-way adapted to communicate with the steam jacket and chamber, a rotary valve mounted in said steam chamber and controlling the flow of steam from said passage-way, a common manual control for said valves, a valve mounted in the steam chamber valve and controlling the passage of steam to the piston rotors, and means for actuating said piston rotor valve, substantially as set forth.

7. In a rotary engine the combination of a casing providing a central and side cylinders, a steam jacket, and a steam chamber, piston rotors mounted to operate in the side cylinders, a rotor coöperable with said piston rotors mounted in the central cylinder, a cylinder mounted on the casing and communicating with the steam jacket, a rotary valve mounted in said cylinder and having a passage-way adapted to communicate with the steam jacket and controlling the flow of steam from said passage-way, a rotary exhaust valve, gearing connections between said valves, a common manual control for said gearing connections, a valve mounted in the steam chamber valve controlling the passage of steam to the piston rotors, and means for actuating said piston rotor valve, substantially as set forth.

8. In a rotary engine the combination of a casing providing a central and side cylinders, a steam jacket, and a steam chamber, piston rotors mounted to operate in the side cylinders, a rotor coöperable with said piston rotors mounted in the central cylinder, a cylinder mounted on the casing and communicating with the steam jacket, a rotary valve mounted in said cylinder and having a passage-way adapted to communicate with the steam jacket and the steam chamber, said valve having shaft extensions, a rotary valve mounted in the steam chamber, a rotary exhaust valve, quadrant gears connected to said steam chamber and exhaust valves, quadrant gears mounted on said shaft extensions and meshing with said valve quadrant gears, means for operating the first named rotary valve, a valve mounted in the steam chamber valve controlling the passage of steam to the piston rotors, and means for actuating said piston rotor valve, substantially as set forth, 9. In a rotary engine the combination of a casing providing a cylinder, a steam jacket, a steam chamber, and a passage-way connecting said steam jacket and steam chamber; a piston operable in the cylinder, a rotary valve mounted in the steam chamber controlling the flow of steam from said passage-way, said valve having a sleeve extension, a quadrant gear mounted on said sleeve extension, a lever having a quadrant gear meshing with the valve quadrant gear to actuate said valve, a rotary cut off valve mounted in the steam chamber valve controlling the passage of steam to the cylinder and provided with a sleeve extension, and a lever having spiral connection with the sleeve extension of the valve of the cylinder to actuate said valve, substantially as set forth.

10. In a rotary engine the combination of a casing providing a central and side cylinders, and the head of said casing formed with four ports communicating with said side cylinders, piston rotors mounted to operate in the side cylinders, a rotor coöperable with the piston rotors mounted to operate in the central cylinder, a pair of rotary valves mounted in the head of the casing concentric with said central cylinder and adapted to bring said ports to communicate in pairs with the source of steam supply whereby to drive forward or reverse from one end of the engine, and means for actuating said valves, substantially as set forth.

11. In a rotary engine the combination of a casing providing a central and side cylinders and one end of said casing formed with four exhaust ports communicating with said side cylinders, piston rotors mounted to operate in the side cylinders, a rotor coöperable with the piston rotors mounted in the central cylinder, means for admitting steam to the piston rotors, a pair of valves mounted in the head of the casing and adapted to control the steam to said rotors, and a pair of valves mounted at the exhaust end of the casing adapted to bring said ports to communicate in pairs with said side chambers whereby to exhaust at one end of the engine only for forward driving or reverse, substantially as set forth.

12. In a rotary engine the combination of a casing providing a central and side cylinders, and each head of said casing being formed with four ports communicating with said side cylinders, piston rotors mounted to operate in the side cylinders, a rotor coöperable with the piston rotors mounted in the central cylinder, a pair of valves mounted in the head of the casing and adapted to direct the steam from the ports thereat in pairs to said rotors whereby to drive forward or reverse from one end of the engine, a pair of valves mounted at the exhaust end of the casing adapted to bring the ports thereat to communicate in pairs with said side cylinders whereby to exhaust at the other end of the engine for driving forward or reverse, and means for setting said valves to work in diametrically opposed and reversed pairs, substantially as set forth.

In witness whereof, I have hereunto set my hand and seal at Washington, District of Columbia, this seventh day of August, A. D. nineteen hundred and fifteen.

NEWELL H. MOTSINGER. [L. S.]

Witnesses:
H. H. BYRNE,
E. H. PARKINS.